United States Patent
Smith et al.

(10) Patent No.: US 7,150,101 B2
(45) Date of Patent: Dec. 19, 2006

(54) APPARATUS FOR FABRICATING COMPONENTS

(75) Inventors: Douglas R. Smith, Hamilton, OH (US); Daniel E. Jones, Hamilton, OH (US)

(73) Assignee: General Electric Company, Schenectady, NY (US)

(*) Notice: Subject to any disclaimer, the term of this patent is extended or adjusted under 35 U.S.C. 154(b) by 206 days.

(21) Appl. No.: 10/736,003

(22) Filed: Dec. 15, 2003

(65) Prior Publication Data
US 2005/0126004 A1    Jun. 16, 2005

(51) Int. Cl.
*B21D 51/16* (2006.01)
*F02M 61/00* (2006.01)

(52) U.S. Cl. .............. 29/890.142; 239/533.12

(58) Field of Classification Search ........... 29/890.142, 29/558, 557; 219/69.1; 239/533.12, 533.1; 204/224 M
See application file for complete search history.

(56) References Cited

U.S. PATENT DOCUMENTS

| 4,564,431 A | * | 1/1986 | Miyano | 204/224 M |
| 5,029,759 A | * | 7/1991 | Weber | 239/533.12 |

FOREIGN PATENT DOCUMENTS

JP     361065435     * 4/1986

* cited by examiner

*Primary Examiner*—John C. Hong
(74) *Attorney, Agent, or Firm*—William Scott Andes; Armstrong Teasdale LLP

(57) ABSTRACT

A system for machining a component with complex contour. The machining system includes a coolant flow nozzle with an interior passage with a first portion having a first cross-sectional shape, and a second portion having a second cross-sectional shape, with the second cross-sectional shape selected so that fluid discharged from the nozzle has a selected cross-sectional shape. A method of fabricating a coolant flow nozzle with an interior passage that has a varying cross sectional shape.

14 Claims, 6 Drawing Sheets

APPARATUS FOR FABRICATING COMPONENTS

BACKGROUND OF THE INVENTION

This invention relates generally to methods and apparatus for machining of components, such as gas turbine engine blades and vanes, which have complex contours.

Machining processes, such as grinding, for at least some known components discharge a coolant fluid toward the machining zone in sufficient quantity and velocity to avoid heat damage to the machined component. However, when a complex profile is being machined in a component it may be difficult to provide adequate coolant to the machining zone along the entire profile because fluid flow that exits the nozzle diverges rapidly and may have insufficient velocity to penetrate the machining zone. Moreover, certain machining operations, such as grinding, may be limited to lower wheel speeds during machining due to lack of adequate cooling flows.

The present invention overcomes these difficulties by using a coolant flow nozzle that has an exit aperture for ejecting a fluid jet with a selected cross-sectional shape to substantially match the contour of the component being machined. The fluid flow passage in the nozzle has a first portion having a first cross-sectional shape, and a second portion having a second cross-sectional shape, wherein the second cross-sectional shape is selected such that fluid discharged from the nozzle has a selected cross-sectional discharge pattern. The complex geometry of the fluid flow passage in the nozzle can be machined by using wire electro-discharge machine ("EDM") techniques. The present invention facilitates providing enhanced cooling of the components with complex geometries during machining, leading to more accuracy and repeatability of the machining process. The present invention also enables higher machining speeds to be utilized without creating thermal damage to machined components, with longer tool life.

BRIEF DESCRIPTION OF THE INVENTION

In one aspect, a method for fabricating a component, such as a nozzle, is provided. The method includes forming a specifically selected cross-sectional shape for the exit aperture of the nozzle and forming an inlet aperture with another cross-sectional shape, such that a fluid passage formed between the inlet and exit apertures transitions gradually between the inlet cross-sectional shape and the exit cross-sectional shape. The complex geometry of the fluid flow passage in the nozzle can be machined by using wire electro-discharge machine ("EDM") techniques in which the two ends of the wire are independently controlled in a computer numerical control ("CNC") EDM machine.

A nozzle is provided for directing a cooling fluid towards a component such as a gas turbine blade during machining. The nozzle includes a body including a first end, a second end, and a fluid passage extending between the ends. The fluid flow passage in the nozzle has a first portion having a first cross-sectional shape, and a second portion having a second cross-sectional shape, with the second cross-sectional shape selected so that fluid discharged from the nozzle has a selected cross-sectional shape.

A machining system is provided for machining a component, such as a gas turbine engine blade. The machining system includes a tool having an exterior shape suitable for machining the exterior shape of the component, a mounting fixture that holds the component during machining, and a nozzle which has a fluid passage in it with a first portion having a first cross-sectional shape, and a second portion having a second cross-sectional shape, with the second cross-sectional shape selected so that fluid discharged from the nozzle has a selected cross-sectional shape.

DETAILED DESCRIPTION OF THE INVENTION

As used herein the terms "machining," "machine," and "machined" may include any process used for shaping a component. For example, processes used for shaping a component may include turning, planing, milling, grinding, finishing, polishing, and/or cutting. In addition, and for example, shaping processes may include processes performed by a machine, a machine tool, and/or a human being. The above examples are intended as exemplary only, and thus are not intended to limit in any way the definition and/or meaning of the terms "machining," "machine," and "machined". In addition, as used herein the term "component" may include any object that has been or may be machined. Furthermore, although the invention is described herein in association with a gas turbine engine, and more specifically for use with engine blades and vanes for a gas turbine engine, it should be understood that the present invention may be applicable to any component and/or any machining process. Accordingly, practice of the present invention is not limited to the machining of engine blades, vanes or other components of gas turbine engines. In addition, as used herein the term "machining apparatus" may include any device used to machine a component.

Figure 1:
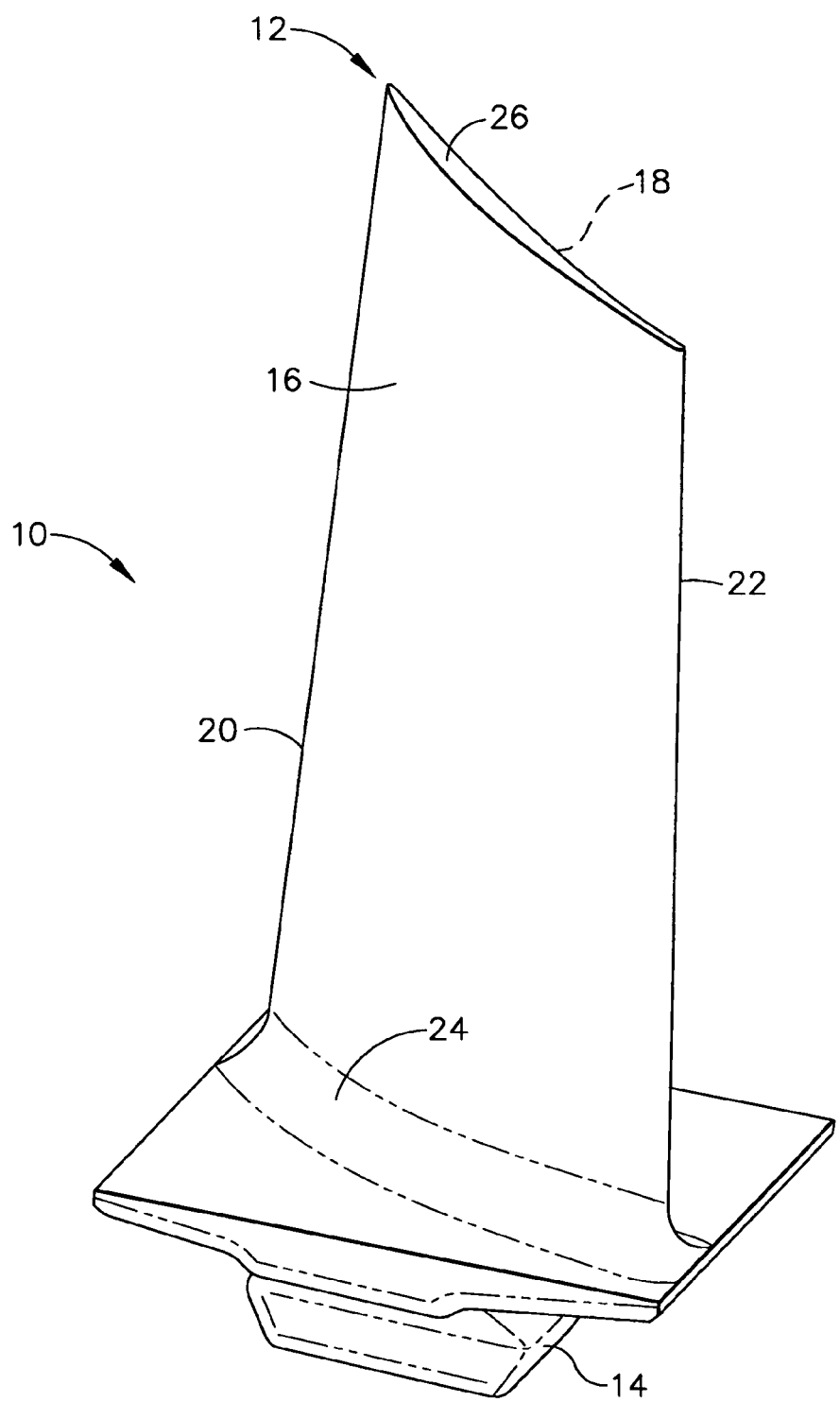
FIG. 1 is a perspective view of an exemplary gas turbine engine blade.

FIG. 1 is a perspective view of an engine blade 10 that may be used with a gas turbine engine (not shown). In one embodiment, a plurality of turbine blades 10 form a high-pressure turbine rotor blade stage (not shown) of the gas turbine engine. Each blade 10 includes an airfoil 12 and an integral dovetail 14 that is used for mounting airfoil 12 to a rotor disk (not shown) in a known manner. Alternatively, blades 10 may extend radially outwardly from a disk (not shown), such that a plurality of blades 10 form a blisk (not shown). Each airfoil 12 includes a first contoured sidewall 16 and a second contoured sidewall 18. First sidewall 16 is convex and defines a suction side of airfoil 12, and second sidewall 18 is concave and defines a pressure side of airfoil 12. Sidewalls 16 and 18 are joined at a leading edge 20 and at an axially-spaced trailing edge 22 of airfoil 12. More specifically, airfoil trailing edge 22 is spaced chordwise and downstream from airfoil leading edge 20. First and second sidewalls 16 and 18, respectively, extend longitudinally or radially outward in span from a blade root 24 positioned adjacent dovetail 14, to an airfoil tip 26.

Figure 2:
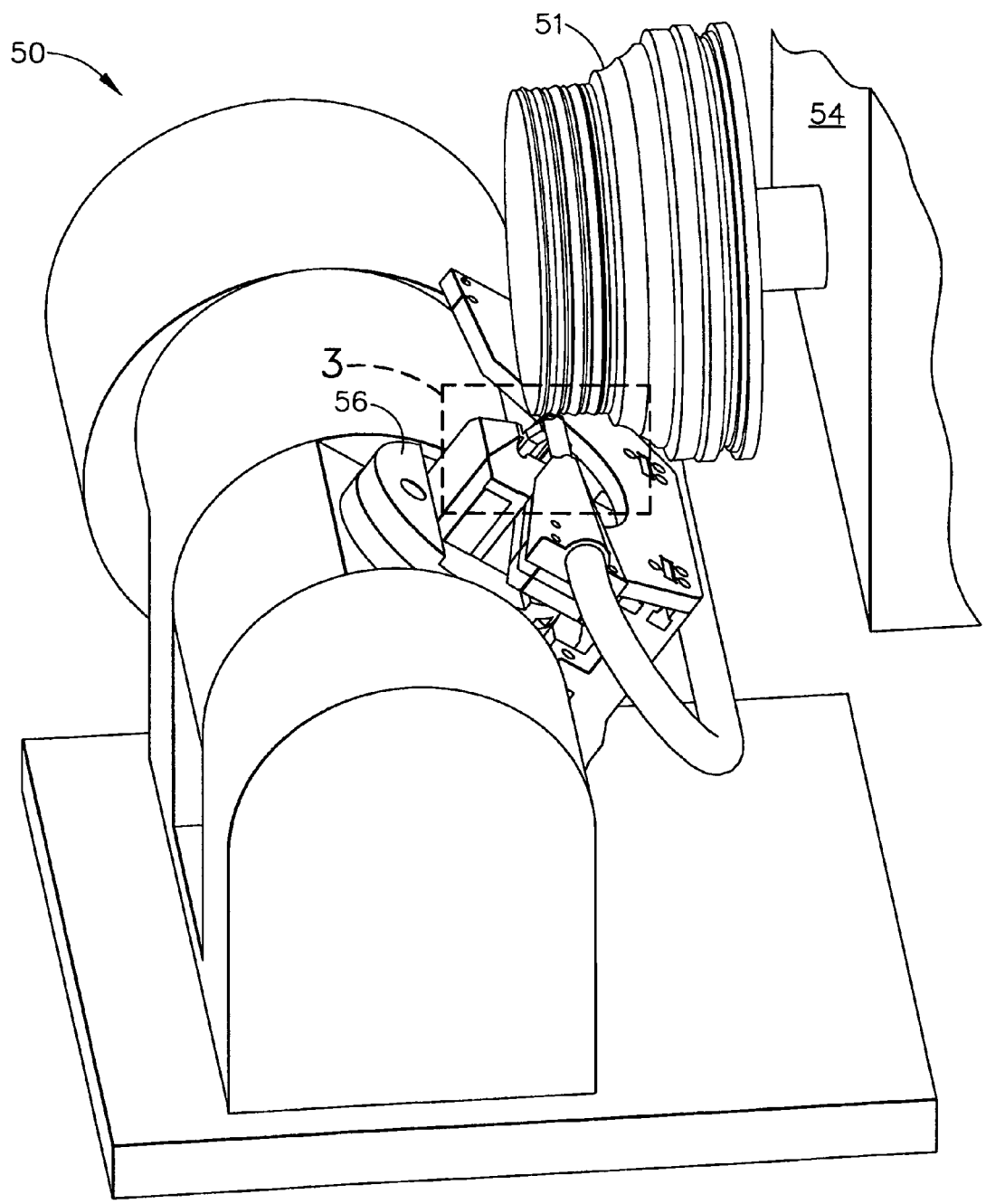
FIG. 2 is a schematic view of an exemplary machining tool assembly for machining a component, such as the gas turbine engine blade shown in FIG. 1.
Figure 3:
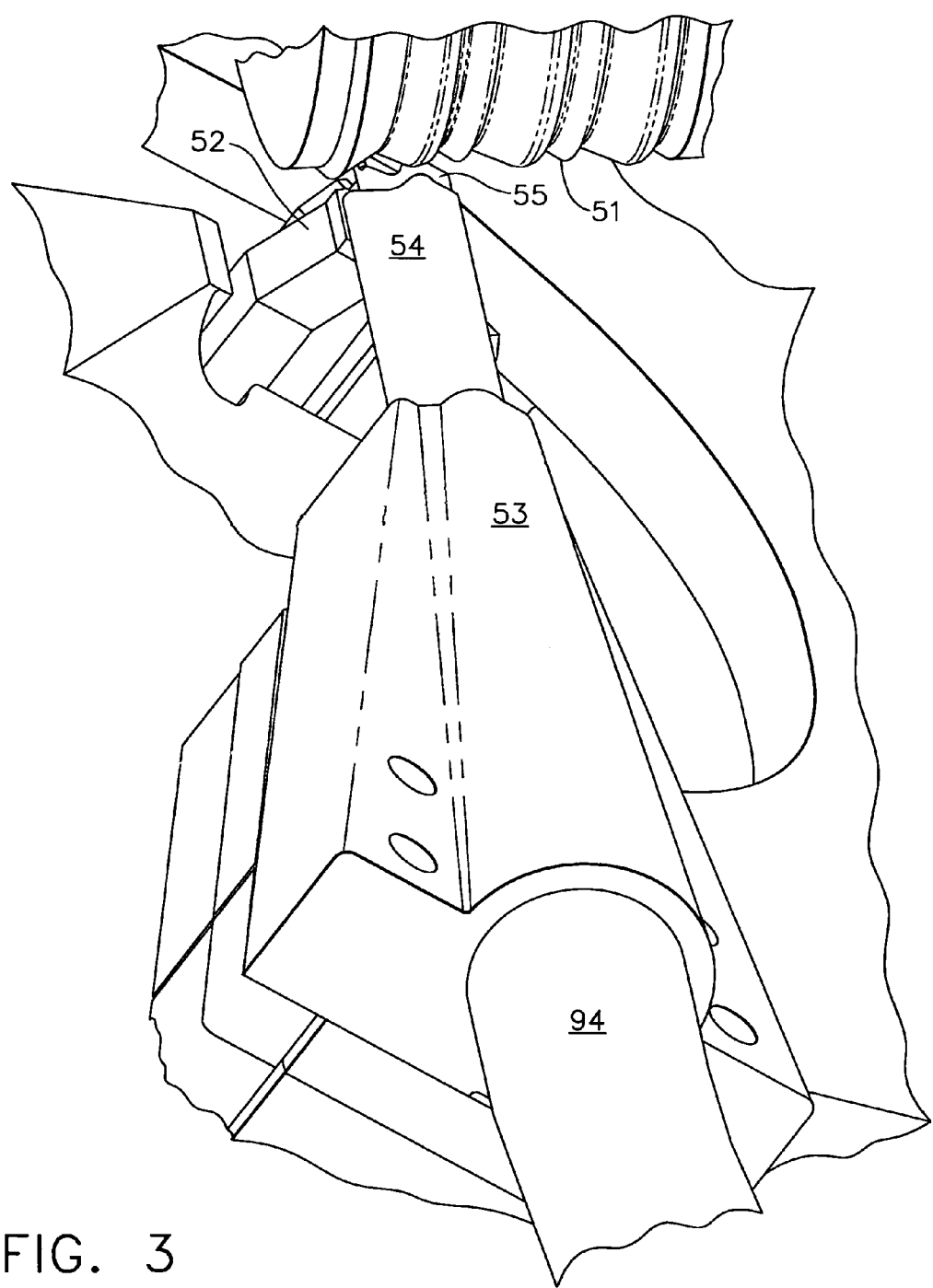
FIG. 3 is a close up view of the machining tool assembly shown in FIG. 2 showing the fluid jet discharged by the nozzle near the region of machining.

FIG. 2 is a schematic view of an exemplary machining system 50 which may be used for machining complex contours on aircraft engine components, such as blade 10 shown in FIG. 1. FIG. 3 shows a close up view of the nozzle coolant discharge region in the machining system shown in FIG. 2. In the exemplary embodiment shown in FIG. 2 and FIG. 3, machining system 50 includes a grinding wheel 51, a component mounting fixture 52 attached to a movable structure 56 and a nozzle 53. Grinding wheel 51 is driven by a motor 54, and has a contoured shape that is variably selected to create a desired contour on the component 55 being machined. The component is secured within the machining system using known component mounting fixtures 52, and coolant nozzle 53 is positioned to discharge a contoured jet of cooling fluid 54 towards component 55 during machining. Although only one coolant nozzle 53 is shown in FIG. 2 and FIG. 3, multiple coolant nozzles 53 can be used in the machining system to discharge multiple jets of contoured coolant flow toward component 55 during fabrication.

Cooling the workpiece during machining facilitates protecting the workpiece from damage that may occur as heat is generated as a result of machining. Over time, continued exposure to the heat may cause thermal stresses, cracking, burning, and/or micro-structural damage to the component. Although cooling fluids can be directed towards components using tubes and simple shaped nozzles, it has been found that such nozzles may be ineffective in preventing machining induced damage in components which have complex contours. Moreover, in such cases the cooling flow may not contact certain locations of the complex contour, resulting in damage at such locations. More specifically, there may be several reasons for their ineffectiveness. First of all, the cooling flow may not adequately reach the component location being machined due to divergence of the fluid stream exiting from the nozzles. Another reason in the case of some machining processes, such as grinding, is that a high rotational speed of the machining tool may induce airflow near the region of machining which disrupts the cooling flow jet away from the component. This is particularly a problem with conventional nozzles which may have to be positioned farther away from the component due to space limitations. In many cases, higher pressure for the cooling flow jet does not help to overcome these problems. Higher discharge pressures may actually result in more divergence and turbulence in the cooling flow stream from conventional cooling flow nozzles.

Figure 4:
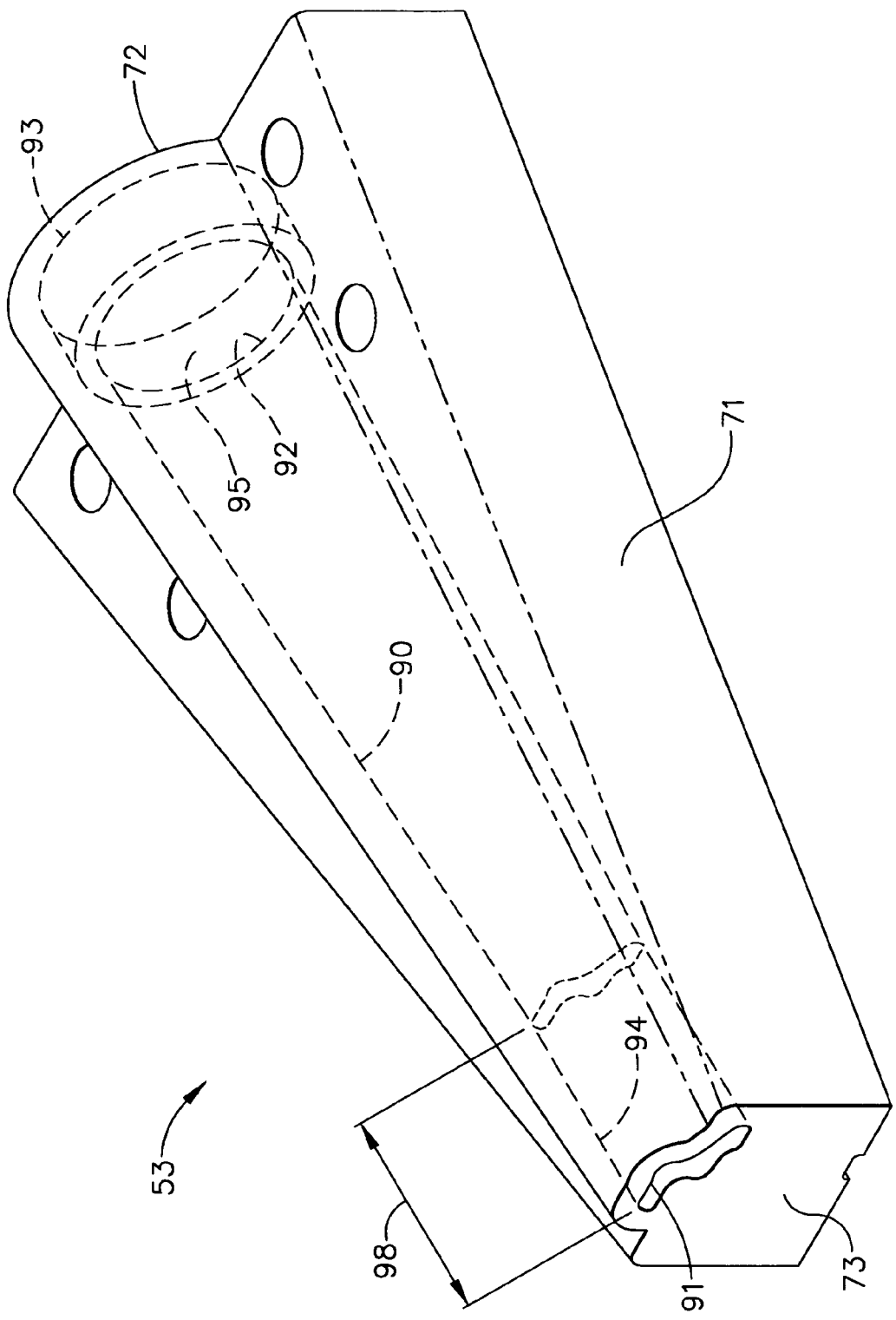
FIG. 4 is a perspective view of an exemplary nozzle that may be used with the machining tool assembly shown in FIG. 2.
Figure 5:
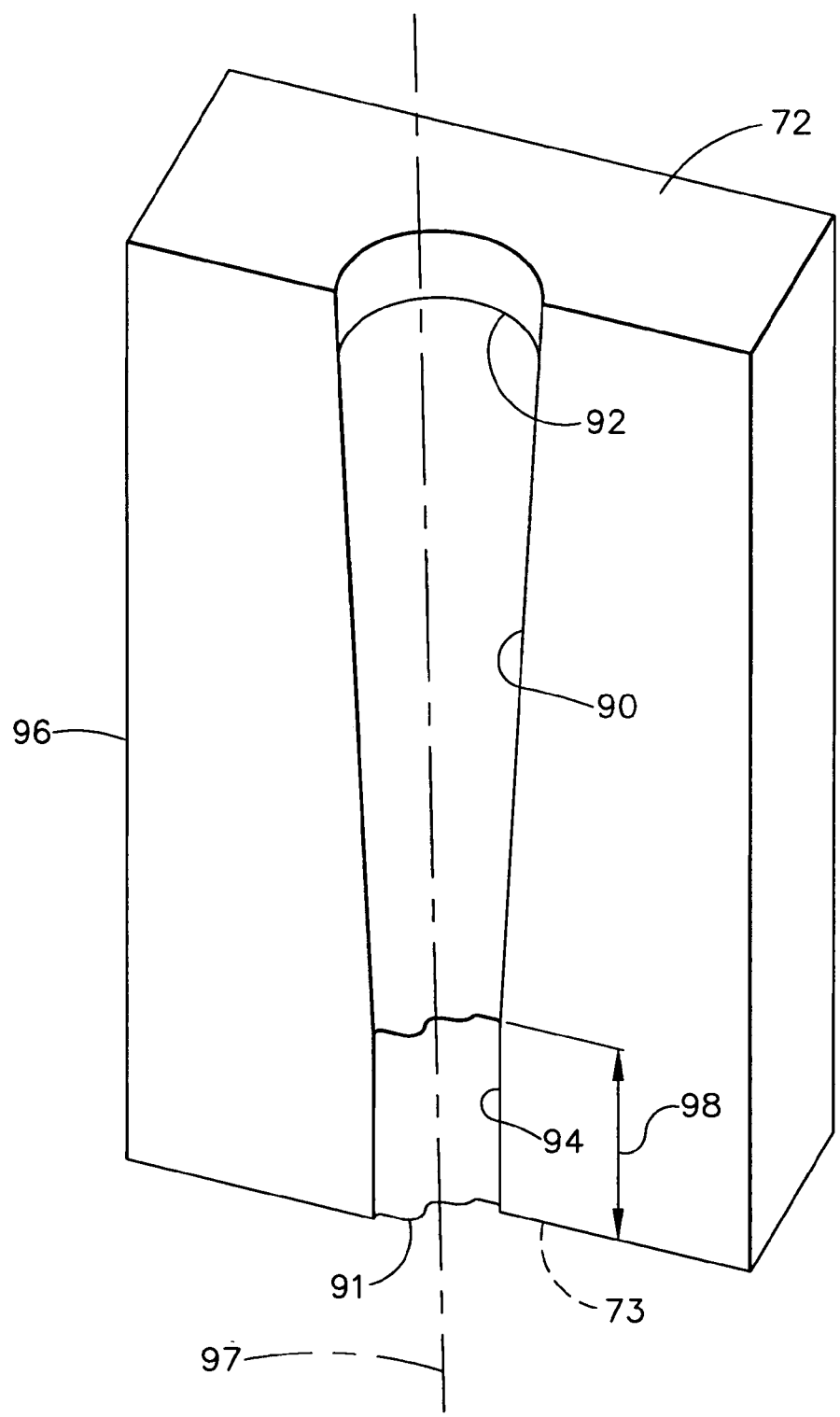
FIG. 5 is a cross section of the starting block of material used to make the nozzle shown in FIG. 4 by the wire Electro Discharge Machining (EDM) process.

FIG. 4 illustrates a nozzle 53 which can overcome some of the problems with conventional cooling nozzles described above. In the exemplary embodiment, nozzle 53 is manufactured from a single piece block of material. FIG. 5 illustrates an example of an interior passage 90 defined within nozzle 53. Nozzle 53 has a body 71, and two ends 72 and 73, each of which may have different interior flow passage cross sectional shapes 91 and 92. Nozzle 53 also has an interior passage 90 through which cooling fluid flows from inlet end 72 to exit end 73. Inlet end 72 includes means to attach it to external sources of supply for the cooling fluid. In the exemplary embodiment, inlet end 72 has a circular recess 93 which can accept the end of a cooling fluid supply tube 94 (shown in FIG. 3) for subsequent welding to nozzle 53. Exit end of interior passage 90 has a specific cross-sectional shape 91 which is generally similar to a portion of the component geometry to be machined, such as dovetail 14 (shown in FIG. 1).

FIG. 5 illustrates an exemplary shape of nozzle interior flow passage 90. The cross-sectional shape 92 of interior passage 90 at inlet end 72 is circular in the exemplary embodiment, although it can be of other cross-sectional shapes as well. The profile of passage 90 at inlet end 72 is selected to substantively match that of connecting tubes 94 (shown in FIG. 3), or other structure supplying cooling fluid to the nozzle 53. A cross-sectional shape of flow passage 90 changes gradually from being circular near inlet end 72 to a selected shape 91 at a distance 98 from exit end 73. There is a region 94 in the flow passage 90 near exit end 73 in which the cross-sectional shape remains constant. A length 98 of region 94 near exit end 73 is selected to facilitate ensuring that flow emerging out of nozzle 53 does not diverge prior to impinging the contour of the component being machined. There may also be a region 95 (shown in FIG. 4) in the flow passage 90 near inlet end 72 in which the cross-sectional shape remains substantially constant. Region 95 facilitates attaching nozzle 53 to external sources of cooling fluid supply.

Pressurized cooling fluid enters the nozzle 53 at inlet end 72, and since the cross-sectional area of nozzle 53 gradually decreases as the fluid traverses passage 90, the fluid is accelerated. The fluid acceleration continues to region 94 in passage 90 wherein the cross-sectional shape begins to remain constant. The region 94 of substantially constant cross-section near exit end 73 facilitates straightening the coolant fluid flow, making it uniform and with reduced turbulence. Length 98 of region 94 near exit end 73 is typically ten times the nominal thickness of the fluid jet profile.

One of the advantages of nozzle 53 is that the cooling fluid jet 54 exiting nozzle 53 has a substantially uniform shape substantially selected to match a portion of the contour of the component 55 being machined. Moreover, this fluid jet 54 shape remains substantially uniform and with very little divergence. This is made possible by appropriately designing the internal passage geometry of the nozzle. The shape and area of the nozzle exit aperture 91 is based on the profile to be machined on the component 55, the tangential velocity of machining tool 51, and the available volumetric flow of coolant. More specifically, the area of exit aperture 91 is selected such that the coolant will cover the entire mass of material to be removed from the component 55 and will exit nozzle 53 at a velocity that is substantially equal to or exceeding, the tangential velocity of the machine tool 51. Since the capacity of the cooling system is generally known, the exit velocity is determined by dividing coolant flow rate by the area of the exit aperture 91.

The straight portion 94 of nozzle 53 facilitates producing a non-diverging stream from nozzle 53 into the machine zone (typically two to ten inches away from the nozzle). In one embodiment, a length 98 is 10 times the minor dimension of the exit aperture 91. For example, in a nozzle with an exit aperture length of approximately 1.5 inches and with a width of approximately 0.050 inches the straight portion length is selected to be approximately 0.50 inches, and the coolant fluid velocity profile will be adequately developed within nozzle 53. The inlet aperture profile is then matched to the cross-sectional area of the tube, pipe, or fitting 94 (FIG. 3) that is delivering the coolant to the nozzle. This is normally a circular cross-section from a standard size component that has been chosen to fit into the geometric constraints of the overall machining system 50, but any shape can be accommodated by the manufacturing method that is the subject of this invention.

From the cross-section of the inlet, the inlet area is calculated. The inlet flow velocity can be calculated in the same manner as the exit flow because the volumetric flow is constant from the inlet to the outlet of the nozzle. The required pressure at the inlet of the nozzle can then be determined by applying standard fluid flow equations well known in the art. The length of the transition from the inlet aperture 92 to the beginning of the straight portion 94 of the nozzle is then selected based on the geometric limitations of machining system 50. In general, it is preferable to select the longest transition length available in order to generate a smooth flow. It is possible to obtain cooling flow rates of 25 gallons per minute per nozzle at velocities of about 65 meters/sec using cooling fluid pressures of about 318 psi. The smooth, uniform, contoured cooling flow jet 54 impinges the matching contour of the component being machined, providing cooling at all locations along the contour of the component 55 in contact with the machining tool 51. Improved cooling at all locations of the contour of the component facilitates reducing heat damage to component 55 from machining.

Another advantage of cooling nozzle 53 is that it can be located inside the machining system 50 and farther away from the actual zone of machining. This is possible because the usual problem of divergence and turbulence of the cooling fluid jet stream from traditional nozzles has been facilitated to be reduced by the invention that is the subject matter of this patent. The location of nozzle 53 relative to component 55 and machine tool 51 eliminates the need to adjust the cooling nozzles each time a tool needs to be changed and reduces machine set up time. This also enhances repeatability of the machining process to produce components of consistent quality by eliminating one source of variation.

Yet another advantage of the cooling flow nozzles which is the subject of this patent is that because of their highly effective cooling of components during machining, they make higher material removal rates possible. For example, in the grinding of aircraft engine components, with the use of coolant flow nozzles such as the ones described herein, it is possible to increase the grinding wheel tangential speeds and feed rates without any substantial heat damage to the components.

Yet another advantage of the cooling flow nozzles which is the subject of this patent is that cooling of the components and machine tools using these highly effective cooling nozzles reduces the need to frequently dress the profile of the grinding tools. The effective cooling of the grinding wheel results in a reduction of the material removed from the grinding wheel which reduces the frequency of grinding wheel dressing needed. This reduces the machine set up time and increases tool life and productivity.

Figure 6:
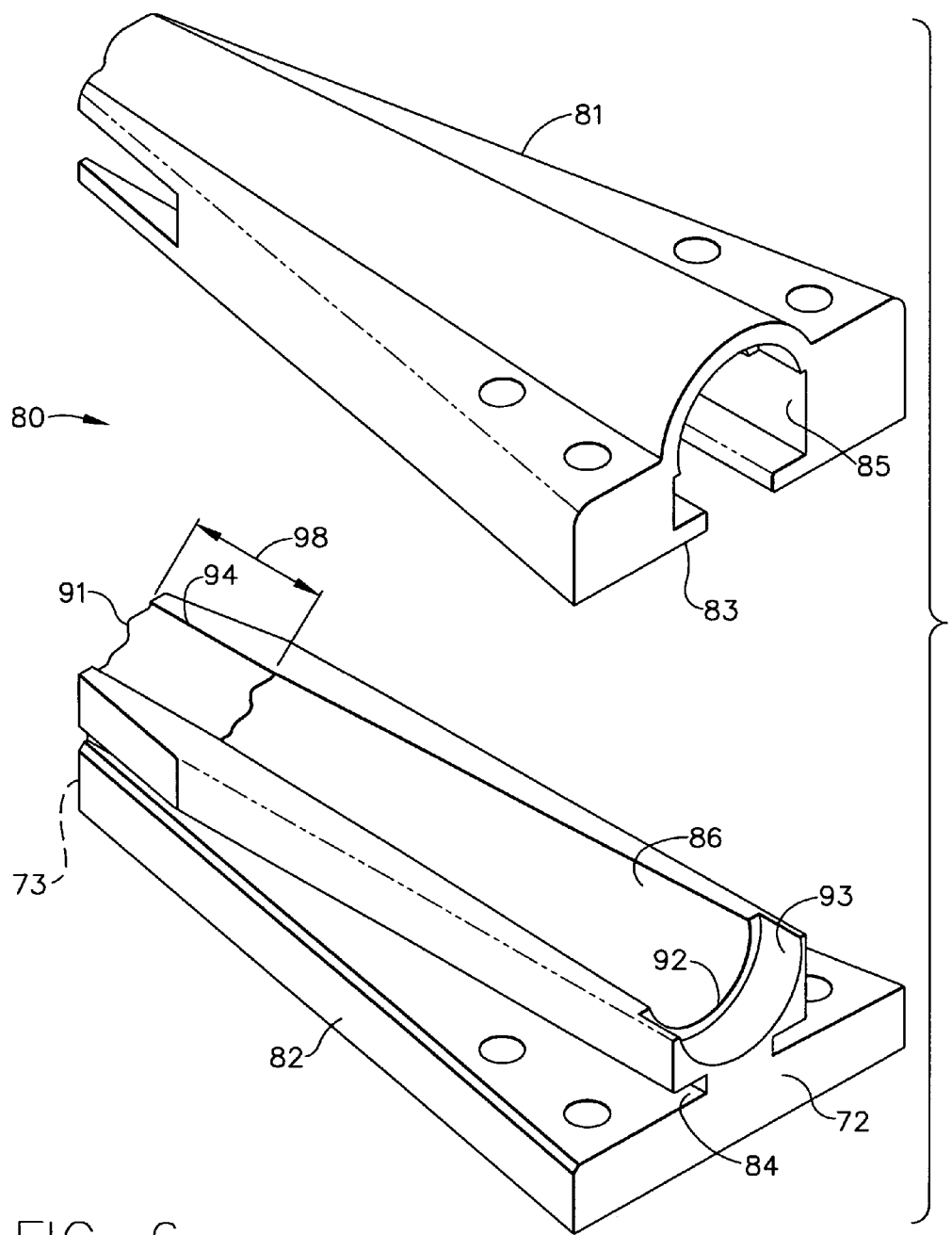
FIG. 6 is an exploded view of an alternative embodiment of the nozzle that may be used with the machining tool assembly shown in FIG. 2, showing multiple parts of the nozzle.

FIG. 6 shows another alternative embodiment 80 of the cooling flow nozzle assembly that may be used in the machining system 50 shown in FIG. 2. Nozzle assembly 80 is a two-piece design which has a top piece 81 and a bottom piece 82. Each piece has features 83 and 84 machined thereon which enables them to be assembled together into a single nozzle 53. Each piece 81 and 82 defines a portion of the interior flow passage 85 and 86 machined into it. The two pieces 81 and 82 are machined separately and are later assembled together to form a nozzle as shown in FIG. 4. Once assembled, the cooling flow nozzle assembly 80 functions exactly as described previously.

The cooling fluid flow path inside the nozzle 53 can be manufactured by any suitable conventional or non-conventional machining process. One particularly convenient way to make the nozzles is by electro-discharge machining. A block of any suitable material 96 (FIG. 5), such as stainless steel, high carbon steel or hardened steel is first made. A starter hole (not shown) is then drilled through the block 96. An electro-discharge machine ("EDM") tool wire 97 is inserted through the starter hole in the block. Electro-discharge machining is then performed along the entire length of the block to create the shape of the profile 91 at the exit end 73 of the nozzle. This is accomplished by using a computer numerical control ("CNC") EDM machine in which both ends of the EDM wire 97 are guided to follow the two-dimensional contour of the exit profile 91 of the nozzle. The inlet profile 92 (FIG. 5) at the inlet end 72 of the nozzle and the gradual transition from the exit profile to the inlet profile is then created by using the CNC EDM machine. This is accomplished by independently controlling the path traversed by the two ends of the EDM wire tool where the EDM wire at the inlet end follows the inlet contour 92 of the nozzle and the end of the EDM wire at the exit end follows contour 91 at a location which is located a distance 98 from the exit end 73 of the nozzle.

While the invention has been described in terms of various specific embodiments, those skilled in the art will recognize that the invention can be practiced with modification within the spirit and scope of the claims.

What is claimed is:

1. A nozzle, comprising:
   a body comprising an inlet end, an outlet end, and an interior wall defining a fluid passage extending therebetween,
   said fluid passage comprising a first portion, a second portion and an intermediate portion extending therebetween,
   said first portion extending from said inlet end to said intermediate portion and comprising a first substantially constant cross-sectional shape, and
   said second portion extending from said intermediate portion to said outlet end and comprising a substantially constant second cross-sectional shape that is different than said first cross-sectional shape, said second cross-sectional shape selected such that fluid discharged from said second portion has a pre-selected cross-sectional discharge pattern.

2. A nozzle in accordance with claim 1 wherein a cross-sectional shape of said intermediate portion tapers gradually from said first cross-sectional shape to said second cross-sectional shape.

3. A nozzle in accordance with claim 1 wherein said second portion extends an axial distance from said body outlet end towards said first portion.

4. A nozzle in accordance with claim 1 wherein said fluid passage is fabricated using a machining process.

5. A nozzle in accordance with claim 4 wherein said fluid passage is formed using an electro-discharge machining process.

6. A nozzle in accordance with claim 1 wherein said nozzle is formed from at least one block of stock material.

7. A machining system for machining a component, said machining system comprising:
   a tool having an exterior shape for use in machining at least a portion of an exterior shape of the component;
   a component mounting fixture that holds the component during machining; and a coolant flow nozzle comprising a body, a first end, a second end, and an interior wall defining a fluid passage extending therebetween, said fluid passage comprising a first portion, a second portion and an intermediate portion extending therebetween, said first portion extending from said first end to said intermediate portion and having a first cross-sectional shape, said second portion extending from said intermediate portion to said second end and having a second cross-sectional shape that is different than said first cross-sectional shape, said second cross-sectional shape selected so that fluid discharged from said second portion has a pre-selected cross-sectional discharge pattern.

8. A machining system in accordance with claim 7 wherein a cross-sectional shape of said intermediate portion tapers gradually from said first cross-sectional shape to said second cross-sectional shape.

9. A machining system in accordance with claim 7 wherein said flow nozzle second cross-sectional shape extends an axial distance at least partway between said nozzle first and second portions.

10. A machining system in accordance with claim 7 wherein said coolant flow nozzle fluid passage is formed using a machining process.

11. A machining system in accordance with claim 7 wherein said coolant flow nozzle is formed from a single block material.

12. A machining system in accordance with claim 7 wherein said coolant flow nozzle is fabricated from a plurality of blocks of material.

13. A machining system in accordance with claim 7 wherein said coolant flow nozzle is removably coupled to a movable structure that holds the tool during machining such tat the nozzle moves in tandem with the tool during machining of the component.

14. A machining system in accordance with claim 7 further comprising a second coolant flow nozzle positioned to discharge cooling fluid towards the component during machining.

* * * * *

UNITED STATES PATENT AND TRADEMARK OFFICE
CERTIFICATE OF CORRECTION

PATENT NO.       : 7,150,101 B2
APPLICATION NO.  : 10/736003
DATED            : December 19, 2006
INVENTOR(S)      : Smith et al.

It is certified that error appears in the above-identified patent and that said Letters Patent is hereby corrected as shown below:

In Claim 13, column 8, line 13, delete "tat the nozzle" and insert therefor -- that the nozzle --

Signed and Sealed this

Twenty-seventh Day of November, 2007

JON W. DUDAS
*Director of the United States Patent and Trademark Office*